(12) United States Patent
Hou

(10) Patent No.: US 11,506,161 B2
(45) Date of Patent: Nov. 22, 2022

(54) FUEL INJECTOR FOR ON-DEMAND MULTI-FUEL INJECTION

(71) Applicants: QuantLogic Corporation, Sugar Land, TX (US); Deyang Hou, Sugar Land, TX (US)

(72) Inventor: Deyang Hou, Sugar Land, TX (US)

(*) Notice: Subject to any disclaimer, the term of this patent is extended or adjusted under 35 U.S.C. 154(b) by 0 days.

(21) Appl. No.: 17/044,859

(22) PCT Filed: Apr. 2, 2019

(86) PCT No.: PCT/US2019/025262
§ 371 (c)(1),
(2) Date: Oct. 1, 2020

(87) PCT Pub. No.: WO2019/195202
PCT Pub. Date: Oct. 10, 2019

(65) Prior Publication Data
US 2021/0148314 A1 May 20, 2021

Related U.S. Application Data

(60) Provisional application No. 62/651,590, filed on Apr. 2, 2018.

(51) Int. Cl.
*F02M 43/04* (2006.01)
*F02D 19/06* (2006.01)
*F02M 61/10* (2006.01)

(52) U.S. Cl.
CPC ......... *F02M 43/04* (2013.01); *F02D 19/0694* (2013.01); *F02M 61/10* (2013.01); *F02M 2200/16* (2013.01); *F02M 2200/46* (2013.01); *F02M 2200/50* (2013.01)

(58) Field of Classification Search
CPC .... F02M 43/04; F02M 61/10; F02M 2200/16; F02M 2200/46; F02M 2200/50; F02M 47/027; F02M 61/04; F02D 19/0694; F02D 19/081
See application file for complete search history.

(56) References Cited

U.S. PATENT DOCUMENTS

| 8,820,295 B2 * | 9/2014 | Coldren | F02D 19/0694 123/304 |
| 2014/0188372 A1 * | 7/2014 | Puckett | F02D 19/0694 701/104 |
| 2017/0175693 A1 * | 6/2017 | Hou | F02M 61/182 |
| 2018/0347500 A1 * | 12/2018 | Nooijen | F02D 41/3872 |

\* cited by examiner

*Primary Examiner* — Xiao En Mo

(57) ABSTRACT

A fuel injector has means to directly inject one type of fuel or two types of fuels collectively with fuel ratios on demand. Once being used as a single fuel injector, the injector can enable injection rate shaping. Once being used as a dual fuel injector, the injector can tailor fuel properties on demand. The fuel injector has the capability to enable tailored chemical and thermal-physical fuel properties to enable high efficiency clean combustion for different engine loads and speeds.

13 Claims, 4 Drawing Sheets

FUEL INJECTOR FOR ON-DEMAND MULTI-FUEL INJECTION

This application claims the priority of US Provisional Application 62651590, filed on Apr. 2, 2018.

TECHNICAL FIELDS

This invention is related to a fuel injector, fuel injection method, and an internal combustion engine. Specifically, this invention disclosed a fuel injector which can collectively inject two types of fuels differentiated by at least one parameter of pressure, molecular structure or thermodynamic phases, thus has the capability to tailor fuel properties on demand, and an engine using at least one such fuel injector, which can be a spark-ignition engine or a compression-ignition engine.

BACKGROUND OF THE INVENTION

Description of the Related Art

Progress has been made in recent years for advanced combustion modes, such as Homogeneous-Charge Compression-Ignition (HCCI) combustion, reactivity controlled compression ignition (RCCI) and Premixed Charge Compression Ignition (PCCI). However, many issues remain to be solved to control the ignition timing, the duration of combustion, the rate of combustion for various load and speed conditions. It is desirable to have a fuel injector which can directly inject two fuels differentiated by at least one parameter of injection pressure, molecular structure, and thermodynamics phases. Further, it is desirable to inject two types of fuels to tailor fuel properties on demand at different injection timings under different engine load and speed conditions.

However, even though many inventions have been disclosed for dual fuel injectors and injectors with variable orifices, issues related to manufacture complexity and fuel leaking have prevented many inventions from being mass production viable. Furthermore, few of previous disclosed arts can offer the injection capability of selectively and collectively direct inject different fuels without interfering with each other between the operations of injecting different fuels. Thus, previous arts demands significant control complexity, especially for synchronizing the dual needle operations normally used for dual fuel injections.

SUMMARY OF THE INVENTION

It is our goals of this invention to at least solve some of the major issues facing previous arts. More specifically, this invention offers a novel composite needle valve design which can operate both selectively and collectively to give the freedom to inject either a single fuel, either one fuel of two supplied fuels, or a combination of two supplied fuels, on demand to tailor fuel properties based on engine operation conditions and the need for optimizing combustion.

Figure 1:
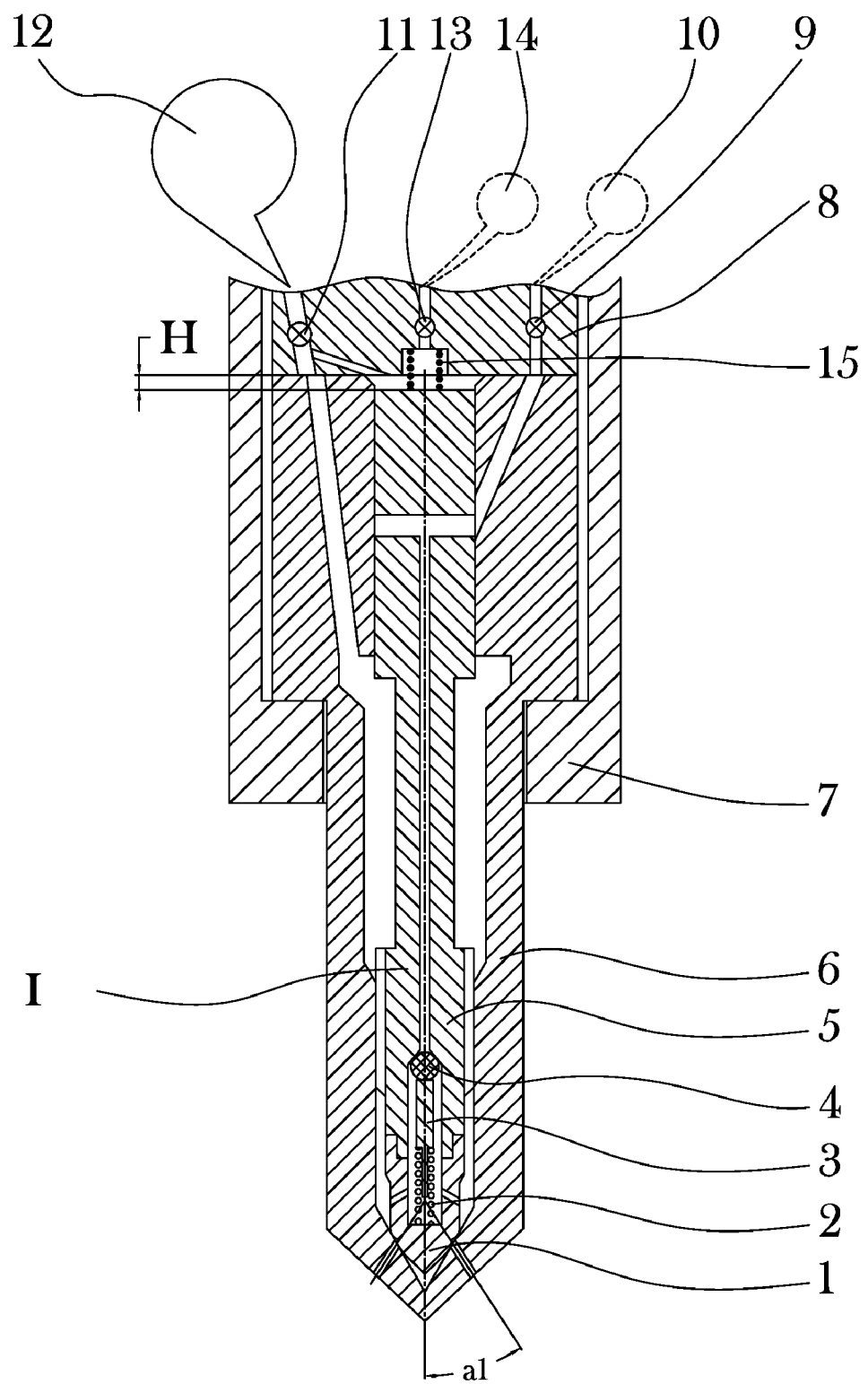
FIG. 1 is a fragmentary sectional view of a first exemplary embodiment of an injector of the invention with only key components marked.
Figure 2:
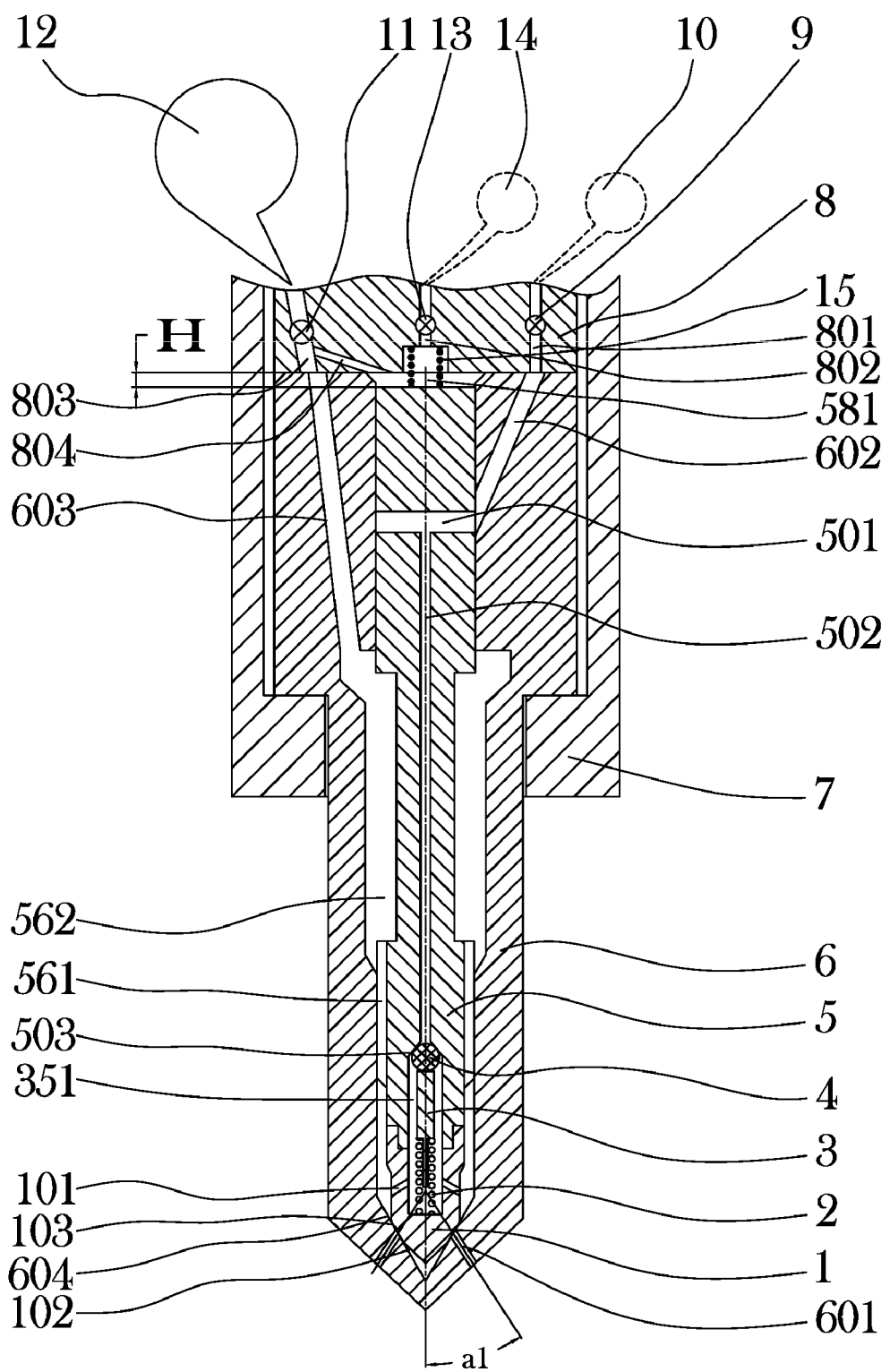
FIG. 2 is the same as FIG. 1 except with detailed notations for key components, key fuel passages, key surfaces, and key pressure control chambers marked.
Figure 3:
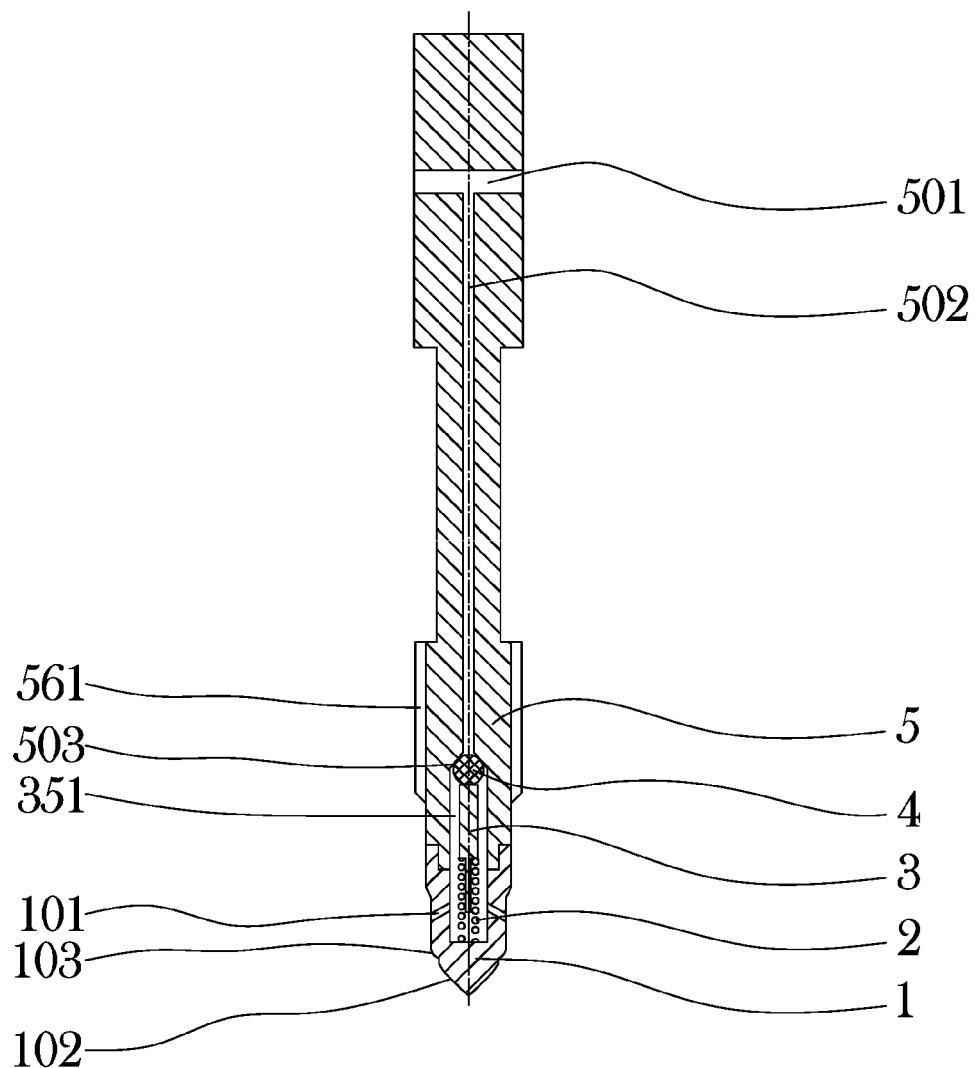
FIG. 3 is an exemplary embodiment of the composite needle valve.
Figure 4:
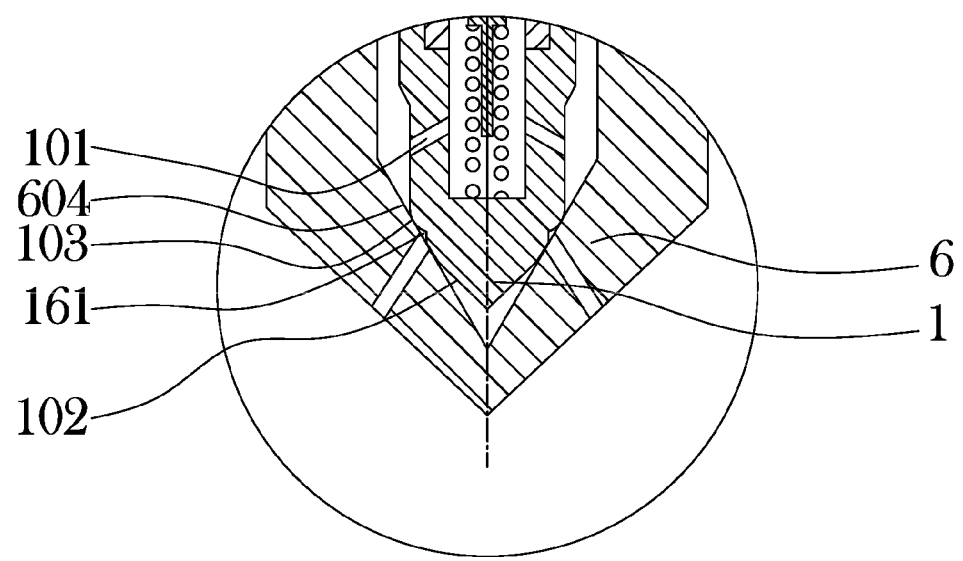
FIG. 4 is the enlarged sectional view of the tip of the composite needle valve.

I—composite needle valve;
1—tip of the composite needle valve I; 101—outlets of I, 102, 103—tip surface sections of I;
2—spring within I;
3—T component;
4—one way check valve;
5—top section of needle valve I; 501, 502, 351—fuel passages within needle valve; 503—valve seat for one way check valve;
6—nozzle body; 601—fuel outlets; 602, 603, 562—fuel passages; 604—inner nozzle surface close to nozzle tip;
7—tighten nut;
8—valve block which holds valves and fuel passages, 801—high pressure fuel passage to control valve 9, 802—fuel passage to venting valve 13, 803—high pressure passage to control valve 11; 804—high pressure fuel passage to pressure control chamber 581;
9—flow control valve;
10—high pressure fuel reservoir;
11—one way check valve, to block fuel from flowing into 12 from within nozzle;
12—high pressure fuel reservoir;
13—pressure release control valve;
10 and 12 can be one such as common rail holding one type of fuel, or two common rails for different fuels or for one fuel with different pressures;
14—low pressure fuel reservoir or fuel sink;
a1—half multiple jet spray angle for fuel injection outlets 601;

DETAILED DESCRIPTION OF THE PREFERRED EMBODIMENTS

A first embodiment was shown in FIG. 1 to FIG. 4. FIG. 1 shows a state of the needle valve at seating position.

We have illustrated one embodiment here. For those skilled in the art, it is easy to give alternatives based on the same operation mechanism. The embodiment illustrated here should be considered as an example without limiting the scope of the invention. Other embodiments with the same key characteristics are considered under the scope of this invention. For example, the first fuel and second fuel are the same fuel, thus the injector becomes a single fuel injector. Following features are considered as the key characteristics of the invention.

Statement A:

A fuel injector comprising:

a nozzle body (6) comprising passages (603, 562, 602) for fuels, an inner cylindrical bore for receiving a composite needle valve (I) which can move up and down in axial direction, at least one group of fuel injection outlets (601) in said nozzle body, at least one spring (15) which urges said composite needle valve (I) into a biased seating position to block fuels, and a valve block (8) holding control valves (9, 13) and having fuel inlets connected to at least one of two pressured fuel reservoirs (10, 12), a pressure control chamber (581) which can press and release the said composite needle valve (I), wherein said composite needle valve contains a one way check valve (4).

A fuel injector of STATEMENT A, comprising:

(i) a nozzle body (6) comprising passages (603, 562, 602) for fuels, an inner cylindrical bore for receiving a composite needle valve (I) which can move up and down in axial direction, at least one group of fuel injection outlets (601) in said nozzle body, at least one spring (15) which urges said composite needle valve (I) into a biased seating position to block fuels, and a valve block (8) to hold control valves (9, 13) and having fuel inlets connected to at least one of two pressured fuel reservoirs (10, 12), a pressure control chamber (581) which can press and release the said composite needle valve (I) through connecting to fuel reservoirs (12, 14) with different pressures, and (ii) said composite needle valve is composing of inner fuel channels (501, 502, 351) connected to independently controlled fuel reservoir (10), an one way check valve (4) supported by a T shape component (3) and a spring (2) which urges the said check valve (4) against its seat (503), capped by needle tip (1) which has fuel outlets (101), has an opening position which is moving up toward nozzle large end to inject fuel from at least one pressurized fuel reservoir through fuel injection outlets (101, 601), and a seating position to block fuel flow.

A fuel injector of STATEMENT A, wherein it is comprising at least two control valves (9, 13) to block or connect at least one type of fuel from high pressure fuel reservoirs (10, 12) to low pressure fuel reservoir (14) to produce the lifting and closing forces on said composite needle valve (I) through generating pressure differences in pressure control chamber (581).

A fuel injector of STATEMENT A, wherein it is comprising at least two independent control valves (9, 13) to block or connect two types of fuels from high pressure fuel reservoirs (10, 12) with different pressures, wherein one fuel stream from higher pressure reservoir (10) can be mixed with one fuel stream from lower pressure reservoir (12) on demand within the nozzle through activating said one way valve (4).

A fuel injector of STATEMENT A, wherein the said composite needle valve (I) is made by press fitting two separate components (5, 1) together. Welding can be applied to the contact lines between the two separate components to ensure integrity.

A fuel injector of STATEMENT A, wherein the said composite needle valve has needle guide (561) which is in touch with nozzle boy (6) inner surface, a needle tip bearing a sealing arc (103), and another tip section (102) which is substantially close but not in touch with nozzle inner surface at seating position.

A fuel injector of STATEMENT A, wherein it contains a one-way check valve (11) to block fuel within nozzle from flowing into pressure reservoir (12).

Statement B:

A fuel injection method, wherein it is composing steps to activate at least two independent control valves (9, 13) to block or connect two types of fuels from high pressure fuel reservoirs (10, 12) with different pressures, wherein one fuel stream from higher pressure reservoir (10) can be mixed with one fuel stream from lower pressure reservoir (12) on demand through activating said one-way check valve (4).

A fuel injection method of STATEMENT B, wherein two streams of different fuels through two separate fuel channels (502, 603) can be independently controlled by control valves (9, 13) but mixed within nozzle tip on demand right before being injected together by lifting the said composite needle valve (I) and through fuel outlets (101, 601), wherein, it has means to inject different fuels collectively with different fuel ratios on demand.

A fuel injection method of STATEMENT B, wherein it has steps of mixing two fuel streams with pressure difference less than 200 bar.

A fuel injection method of STATEMENT B, wherein it has steps of mixing two fuel streams of different chemical reactivity, with the ratio of less reactive fuel being less than 10%.

An internal combustion engine using at least one said fuel injector of STATEMENT A, which can be a spark-ignition engine or a compression-ignition engine, wherein it has means to inject dual fuels with different ratios to tailor fuel properties on demand based on engine loads and speeds.

An internal combustion engine using at least one said fuel injection method of STATEMENT B, which can be a spark-ignition engine or a compression-ignition engine, wherein it has means to inject dual fuels with different ratios to tailor fuel properties on demand based on engine loads and speeds.

A combustion method, using at least one of the fuel injection methods discussed above, wherein it has means to optimize combustion under different operating conditions, through tailoring fuel chemical or thermal-physical properties on demand based on different needs under different operating parameters, such as engine loads and speeds.

A combustion method, wherein one fuel stream is of diesel like fuel with higher chemical reactivity, one stream is with lower chemical reactivity such as gasoline, ethanol, methanol, methane, naphtha, water, wherein it has means to optimize combustion under different operating conditions, through blending the two streams on-demand within nozzle to tailor fuel chemical or thermal-physical properties based on different needs under different operating parameters, such as engine loads and speeds.

The word 'fuel' in this application should be interpreted as a general media and an exemplary description. In this sense, at least one 'fuel' could be water, supercritical liquids, or a gas media, etc.

The invention claimed is:

1. A fuel injector comprising:
a nozzle body comprising passages for fuels, an inner cylindrical bore for receiving a composite needle valve configured to move up and down in an axial direction, at least one group of fuel injection outlets in the nozzle body, at least one spring configured to urge the composite needle valve into a biased seating position to block the fuels, and a valve block holding at least two independent control valves and having fuel inlets connected to a first pressured fuel reservoir and a second pressured fuel reservoir having a lower pressure than the first pressured fuel reservoir, a pressure control chamber configured to press and release the composite needle valve, wherein the composite needle valve contains a one way check valve;
wherein the independent control valves block or connect the fuels from the first and second pressured fuel reservoirs, and wherein a first fuel stream from the first pressured fuel reservoir can be mixed with a second fuel stream from the second pressured fuel reservoir on demand within the nozzle body by activating the one way check valve of the composite needle valve.

2. The fuel injector of claim 1, wherein the pressure control chamber is configured to press and release the composite needle valve by connecting to the second pressured fuel reservoir and a third pressured fuel reservoir with a different pressure, than the second pressured fuel reservoir;
wherein the composite needle valve further comprises inner fuel channels connected to the first pressured fuel reservoir, a T shape component to support the one way check valve, and a spring configured to urge the one way check valve against its seat, capped by a needle tip comprising fuel outlets; and wherein the composite needle valve has an opening position in which the composite needle valve is moved up toward a large end of the nozzle body to inject fuel from at least one pressurized fuel reservoir through the fuel injection outlets, and the seating position to block fuel flow.

3. The fuel injector of claim 1, wherein the independent control valves are configured to block or connect at least one type of fuel from the first and second pressured fuel reservoirs to at least one low pressured fuel reservoir to produce lifting and closing forces on the composite needle valve by generating pressure differences in the pressure control chamber.

4. The fuel injector of claim 1, wherein the composite needle valve comprises a top section and a tip.

5. The fuel injector of claim 1, wherein the composite needle valve has a needle guide which touches an inner surface of the nozzle body, a needle tip bearing a sealing arc, and another tip section which is substantially close to but does not touch the inner surface of the nozzle body in the seating position.

6. The fuel injector of claim 1, further comprising a back flow one way check valve to block the fuel within the nozzle body from back flowing into the second pressured fuel reservoir.

7. A fuel injection method comprising the steps of:

activating at least two independent control valves to block or connect to two types of fuels from a first pressured fuel reservoir and a second pressured fuel reservoir with a lower pressure than the first pressured fuel reservoir, wherein a first fuel stream of a first fuel from the first pressured fuel reservoir can be mixed with a second fuel stream of a second fuel different than the first fuel from the second pressured fuel reservoir on demand by activating a one way check valve of a composite needle valve, and wherein the fuel streams pass through two separate fuel channels and are configured to be independently controlled by the independent control valves and mixed within a nozzle tip on demand right before being injected together by lifting the composite needle valve and through a group of fuel injection outlets of the composite needle valve, wherein the method is configured to inject the first fuel and the second fuel together with different ratios of the first fuel and the second fuel on demand.

8. The fuel injection method of claim 7, further comprising the step of mixing the two fuel streams with pressure difference of less than 200 bar.

9. The fuel injection method of claim 7, wherein the first fuel and the second fuel have different chemical reactivity and a weight ratio of the more reactive fuel is less than 10%.

10. The internal combustion engine using at least one fuel injector of claim 1, configured to be a spark-ignition engine or a compression-ignition engine, wherein the at least one fuel injector is configured to inject dual fuels with different ratios of the dual fuels to tailor fuel properties on demand based on operating parameters comprising engine loads or speeds.

11. The internal combustion engine using the fuel injection method of claim 7, configured to be a spark-ignition engine or a compression-ignition engine, wherein the control valves are configured to inject dual fuels with different ratios of the dual fuels to tailor fuel properties on demand based on operating parameters comprising engine loads or speeds.

12. The combustion method, using the fuel injection method of claim 7, wherein the control valves are configured to optimize combustion under different operating conditions, by tailoring fuel chemical or thermal-physical properties on demand based on different needs under different operating parameters, the operating parameters comprising engine loads or speeds.

13. The combustion method of claim 12, wherein a first fuel stream comprises diesel like fuel and a second fuel stream with a lower chemical reactivity than the first fuel stream comprises gasoline, ethanol, methanol, methane, naphtha, or water, wherein the control valves are configured to optimize combustion under different operating conditions, by blending the first fuel stream and the second fuel stream on-demand within the nozzle body, establishing a blended fuel, to tailor the chemical or thermal-physical properties of the blended fuel based on different needs under different operating parameters, the different operating parameters comprising engine loads or speeds.

\* \* \* \* \*